United States Patent [19]
Kritzer

[11] 4,360,958
[45] Nov. 30, 1982

[54] METHOD OF MAKING HEAT EXCHANGERS

[76] Inventor: Richard W. Kritzer, 400 E. Randolph, Chicago, Ill. 60601

[21] Appl. No.: 224,622

[22] Filed: Jan. 12, 1981

[51] Int. Cl.³ .............................................. B23P 15/26
[52] U.S. Cl. .............................. 29/157.3 R; 29/157.4;
29/157.3 B; 29/517; 165/177; 138/115; 228/904; 228/173 E; 228/173 F; 228/183
[58] Field of Search ............... 228/904, 173 E, 173 F, 228/183, 180 R; 29/157.3 R, 157.3 B, 517, 157.4, 157.3 A; 165/177; 138/115

[56] References Cited
U.S. PATENT DOCUMENTS
Re. 29,331 8/1977 Naito .................................. 138/115
1,942,824 1/1934 McLeod ........................... 29/517 X
2,396,522 3/1946 Modine ........................... 165/177 X
3,198,228 8/1965 Naito .................................... 138/115

FOREIGN PATENT DOCUMENTS
538018 9/1940 United Kingdom ................ 165/177

Primary Examiner—Carl E. Hall
Assistant Examiner—V. K. Rising
Attorney, Agent, or Firm—Emrich, Lee, Brown & Hill

[57] ABSTRACT

Method of making multi-port heat exchangers wherein tubular members made of metal that does not well lend itself to being extruded into a plurality of passageways may be divided into multiple passageways by dividers inserted thereinto and adhered thereto.

9 Claims, 7 Drawing Figures

METHOD OF MAKING HEAT EXCHANGERS

BACKGROUND OF THE INVENTION

This invention relates to methods of making heat exchangers, and, more particularly, to methods of making multi-port heat exchangers.

A primary object of the present invention is to afford a novel method of making heat exchangers.

Another object of the present invention is to afford a novel method of making multi-port, tubular heat exchangers.

Multi-port, tubular heat exchangers have been heretofore known in the art, being shown, for example, in my earlier U.S. Pat. No. 3,229,722, and in U.S. Pat. Nos. 3,692,105, issued to Joseph M. O'Connor; and 3,746,086, issued to Stephen F. Pasternak, and the like. It is an important object of the present invention to afford novel improvements over the methods of making multi-port heat exchangers heretofore known in the art.

In the making of multi-port heat exchangers heretofore known in the art, the partition walls dividing the tubular members into the plurality of longitudinally extending passageways or ports have commonly been made in an extrusion process. However, certain metals, such as, for example, copper and steel are difficult, if not impossible, to extrude into such multi-port one-piece tubular members. It is an important object of the present invention to afford a novel method of making multi-port, tubular heat exchangers from such metals.

Another object of the present invention is to afford a novel method of making tubular heat exchangers having outwardly projecting fins spaced longitudinally thereof, from such difficult to extrude metals.

A further object of the present invention is to afford a novel method of making multi-port, tubular heat exchangers which is practical and efficient in operation, and which may be readily and economically used commercially.

Other and further objects of the present invention will be apparent from the following description and claims and are illustrated in the accompanying drawing, which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE EMBODIMENT SHOWN HEREIN

Figure 1:
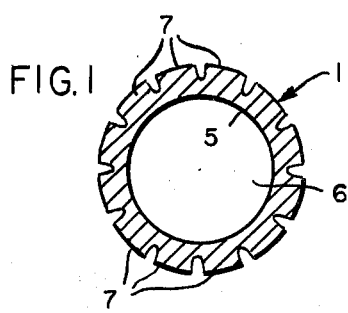
FIG. 1 is a transverse, cross-sectional view through a tubular member of the type used in the preferred embodiment of the invention.
Figure 6:
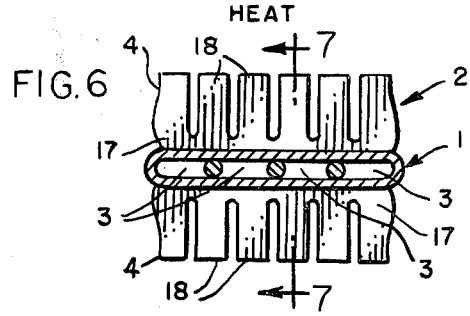
FIG. 6 is a detail cross-sectional view, similar to FIG. 4, but showing a subsequent, successive step in the preferred form of the present invention.

In the presently preferred form of the present invention, an elongated, substantially straight tubular member, which is round in cross-section, such as the tubular member 1 shown in FIG. 1, is converted into a heat exchanger 2, FIG. 6, which is elongated, and, in fact, substantially rectangular in transverse cross-section, and has a plurality of ports or passageways 3 extending longitudinally therethrough, and a plurality of spined fins 4 formed from, and spaced longitudinally along opposite sides of the tubular member 1.

The present invention is particularly well adapted for use with tubular members made of the aforementioned difficult-to-work-with metals, such as the aforementioned copper or steel, and in the preferred form of the present invention the tubular member 1 is made of one of such metals. However, as will be appreciated by those skilled in the art, this is merely by way of illustration of the presently preferred form of the present invention, and other metals may be used in the construction of the tubular member 1 without departing from the purview of the broader aspects of the present invention.

The tubular member 1, as shown in the drawings, in its original form, is substantially circular in transverse cross-section, having an annular circular main body portion 5 defining the passageway 6, which extends longitudinally therethrough. In the preferred form of the tubular member 1, a plurality of equally spaced elongated ribs 7 are spaced around the outer periphery of the body portion 5 and extend longitudinally thereof in substantially straight parallel relation to each other and to the longitudinal axis of the body portion 5.

Figure 2:
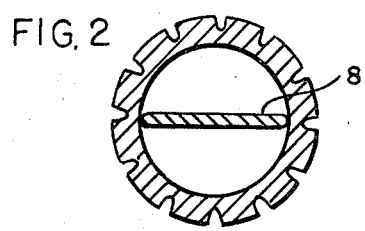
FIGS. 2, 3 and 4 are transverse, cross-sectional views through the tubular member shown in FIG. 1, showing successive steps in the preferred form of the present invention.
Figure 3:
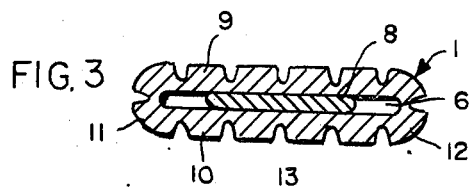

In the practice of the present invention, the tubular member 1 is flattened from the round shape shown in FIG. 1 to an oblong or substantially rectangular-shape, as shown in FIG. 3. This flattening may be accomplished in any suitable manner, such as, for example, passing the tubular member 1 through a suitable rolling mill having a plurality of progressively closer together pairs of rolls. Preferably, prior to such flattening, a mandrel, such as the mandrel 8, FIGS. 2 and 3, is inserted into the tubular member 1 in position to extend longitudinally therethrough and diametrically thereacross. The insertion of the mandrel 8 into the tubular member 1 is for the purpose of assisting in insuring that the aforementioned flattening of the tubular member 1 will not be greater than desired.

In the desired flattened form of the tubular member 1, as shown in FIG. 3, the main body portion 5 and the ribs 7 have been moved into position wherein they afford a top wall 9 and a bottom wall 10, as viewed in FIG. 3, which are disposed in substantially flat, parallel, spaced relation to each other and are disposed between and connected together by side walls 11 and 12, which extend between respective adjacent lateral sides of the walls 9 and 10. In this flattening of the tubular member 1, the passageway 6 has been deformed into a substantially flat, rectangular-shaped passageway, FIG. 3.

Figure 4:
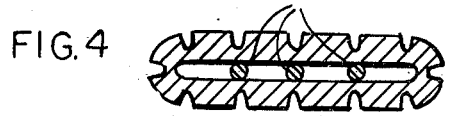

Thereafter, in the practice of the preferred form of the present invention, a plurality of wires 13 are disposed in parallel, spaced relation to each other and to the side walls 11 and 12, FIG. 4. The wires 13, or the outer surfaces thereof, at least, have a lower melting point than that of the tubular member 1. For example, if the tubular member 1 is made of steel having a melting point of 2600° F., the wires 13 may be made of copper having a melting point of 1600° F., or they may be made of steel having a copper coating, which coating has a melting point of 1600° F. Of course, with the tubular member 1 made of steel, the wires 13 may be made of other lower melting point metals, such as, for example, zinc, having a melting point in the nature of 750° F. or aluminum having a melting point in the nature of 1100° F.

On the other hand, if the tubular member 1 is made of copper, in the preferred practice of the present invention, the wires 13 cannot be made of steel (unless, of course, the steel is coated with a metal having a melting point less than that of copper), because it is preferred that the wires 13 have a lower melting point than the tubular member 1, for reasons which will be discussed in greater detail hereinafter.

The wires 13 may be temporarily held in proper position in the tubular member 1, for continuing the next step of the present process, by any suitable manner, such as, for example, having them of such cross-sectional size that they fit into the opening 6 with a snug, but slideable frictional fit, or by inserting wafers of suitable material, such as, for example, carbon, having a thickness less than that of the wires 13 between the adjacent wires 13, and between the side walls 11 and 12 and the closest adjacent wires 13 relative thereto.

Figure 5:
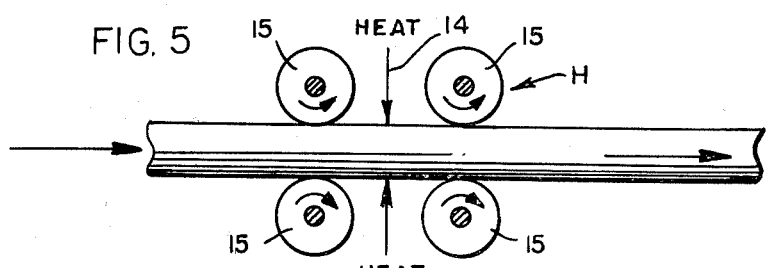
FIG. 5 is a somewhat diagrammatic, side elevational view illustrating a subsequent step in the operation, on the tubular member shown in FIG. 4.
Figure 7:
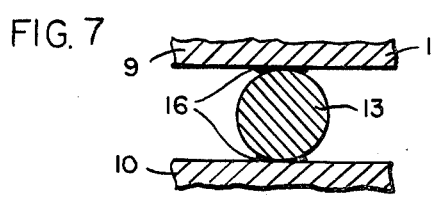
FIG. 7 is a fragmentary, detail sectional view taken substantially along the line 7—7 in FIG. 6.

With the wires 13 thus disposed in the tubular member 1, the tubular member 1 may be fed longitudinally through a suitable heating device, such as the heating device H, diagrammatically shown in FIG. 5, wherein the tubular member 1 and the enclosed wires 13 are heated to a temperature above the melting point of the outer surface, at least, of the wires 13 by a suitable heating unit 14, such as a thermal-induction collar or a micro-wave unit, or the like, while the top wall 9 and bottom wall 10 of the tubular member 1 are firmly held in engagement with the wires 13, by suitable means, such as pressure rollers 15, and then, while the walls 9 and 10 are thus firmly held in engagement with the wires 13, are permitted to cool below the aforementioned melting point to thus adhesively secure the wires 13 in position in the tubular member 1 by the brazing action of the previously melted portions 16 of the respective wires 13, held in engagement with the walls 9 and 10, to afford the adhesive or brazed securing of the wires 13 to the tubular member 1, as shown in FIG. 7.

After the wires 13 have thus been secured in the tubular member 1, the complete assembly is in the form shown in FIG. 4. Thereafter, fins, such as the aforementioned fins 4, may be formed from the ribs 7 projecting outwardly from the top wall 9 and the bottom wall 10 by any suitable method, such as that disclosed in the aforementioned O'Connor U.S. Pat. No. 3,692,105, wherein spaced fins 4 are cut or gouged from the ribs, like the ribs 7, and from underlying wall portions, like the underlying portions of the main body portion 5 of the walls 9 and 10, as described in substantial detail in the aforementioned U.S. Pat. No. 3,692,105. With this construction of the ribs 4, it will be seen that each of the ribs 4 embodies a main body portion 17, cut or gouged from the main body portion 5 of the tubular member 1 and extending across substantially the full width of the walls 9 and 10, with a plurality of spines 18, which have been cut or gouged with the ribs 7, projecting outwardly from each of the main body portions 17.

If desired, of course, the fins 4 may be formed only from the ribs 7, on the walls 9 and 10, in the manner disclosed in my aforementioned U.S. Pat. No. 3,229,722, and in my earlier filed U.S. Pat. No. 3,202,212, the fins, in such an instance, merely being in the form of the spines 18, without the underlying base portion 17, shown in FIG. 6.

It will be remembered that in the preferred practice of the present invention, the wires 13, or, at least, the outer surfaces thereof, have a melting point which is less than that of the tubular member 1. This, rather than the reverse, is true so as to insure that, in the adhesive securing of the wires 13 to the tubular member 1 by the aforementioned brazing, the tubular member 1 is not deformed in shape, the adhesive securing occurring at a temperature below the melting point of the tubular member 1.

It is to be noted that in the previously described method, a plurality of wires 13 were used. As will be appreciated by those skilled in the art, this is merely by way of illustration and not by way of limitation, and a single wire 13 could be used to afford a multi-port heat exchanger, having two passageways disposed on respective opposite sides of the single wire, without departing from the purview of the broader aspects of the present invention.

It will be seen that in the practice of the present invention, a tubular heat exchanger having a plurality of ports or passageways extending longitudinally therethrough may be readily produced in a novel and expeditious manner.

Also, it will be seen that in the practice of the present invention, one is enabled to effectively and efficiently produce such a multi-port heat exchanger from metals of the aforementioned type, which are difficult, if not impossible, to extrude into multi-port units.

Also, it will be seen that the present invention affords a novel method of making tubular heat exchangers having fins projecting outwardly therefrom, and spaced longitudinally therealong.

In addition, it will be seen that the present invention affords a novel method which is practical and efficient in operation, and which may be readily and economically used commercially. Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. The method of making a multi-port heat exchange element comprising
   a. forming an elongated, metal tubular member having a round cross-sectional shape,
   b. flattening said tubular member throughout its length into a cross-sectional shape having
      (1) a top wall and a bottom wall disposed in substantially parallel spaced relation to each other, and
      (2) two side walls disposed between respective adjacent longitudinal edge portions of said top and bottom walls,
   c. inserting elongated metal wires, having an outside surface having a lower melting point then said tubular member, into said tubular member in spaced relation to each other and to said side walls, and d. adhering said outside surface of said wires to said top and bottom walls,

2. The method defined in claim 1, and in which
   a. said adhering is accomplished by
      (1) heating said tubular member and wires to a temperature greater than said melting point of said outer surface and less than said melting point of said tubular member, and
      (2) pressing said top and bottom walls into firm contact with said wires while said tubular member and wires are at said temperature.

3. The method defined in claim 2, and which includes
   a. cooling said tubular members and wires to a temperature below said melting point of said surface while said top and bottom walls are pressed into said firm contact with said wires.

4. The method of making a multi-port heat exchange element comprising
   a. forming an elongated metal tubular member having
      (1) a round transverse cross-sectional shape, and
      (2) a plurality of outwardly projecting, substantially parallel, spaced ribs extending longitudinally along the outer surface thereof,
   b. flattening said tubular member throughout its length into a cross-sectional shape having
      (1) a top wall and a bottom wall
         (a) disposed in substantially parallel, spaced relation to each other, and
         (b) having substantially parallel, outwardly projecting, spaced ribs extending longitudinally along the outer surfaces of said top and bottom walls, and
      (2) two side walls disposed between respective adjacent longitudinal edge portions of said top and bottom walls,
   c. placing elongated metal wires, having an outside surface having a lower melting point than said tubular member, into said tubular member in longitudinally extending relation thereto, with said wires being spaced from each other and from said side walls,
   d. adhering said outer surface of said wires to said top and bottom walls in position to define longitudinally extending passageways through said tubular member between adjacent ones of said wires and between each of said side walls and the respective one of said wires adjacent thereto.

5. The method of making a heat exchanger defined in claim 4, and which includes
   a. forming outwardly projecting fins in spaced relation to each other longitudinally of said ribs.

6. The method of making a heat exchanger defined in claim 4, and which includes
   a. forming, from said ribs and the underlying portions of the respective ones of said top and bottom walls, outwardly projecting fins spaced from each other longitudinally of said tubular member.

7. The method defined in claim 6, and in which
   a. said adhering is accomplished by
      (1) heating said tubular member and said wires to a temperature greater than said melting point of said outer surface and less than the melting point of said tubular member,
      (2) pressing said top and bottom walls into firm contact with said wires while said tubular member and said wires are at said temperature, and
      (3) cooling said tubular member and wires to a temperature below said melting point of said surface.

8. The method defined in claim 7, and in which
   a. said tubular member consists of steel, and
   b. said outer surface consists of copper.

9. The method of making a multi-port heat exchange element comprising
   a. forming an elongated metal tubular member having a substantially round, transverse cross-sectional shape,
   b. flattening said tubular member throughout its length into a cross-sectional shape having
      (1) a top wall and a bottom wall disposed in substantially parallel spaced relation to reach other, and
      (2) two spaced side walls disposed between respective adjacent longitudinal edge portions of said top and bottom walls,
   c. inserting a metal wire, having an outside surface having a lower melting point than that of said tubular member, into said tubular member in spaced relation to said side walls, and
   d. brazing said surface to said top and bottom walls by
      (1) heating said tubular member and wire to a temperature above said melting point of said surface and less than said melting point of said tubular member while said top and bottom walls are pressed against said surface,
      (2) cooling said tubular member and wire below said melting point.

* * * * *

UNITED STATES PATENT AND TRADEMARK OFFICE
CERTIFICATE OF CORRECTION

PATENT NO. : 4,360,958

DATED : November 30, 1982

INVENTOR(S) : Richard W. Kritzer

It is certified that error appears in the above—identified patent and that said Letters Patent is hereby corrected as shown below:

Col. 4, line 65:    delete "then", insert --than--

Col. 6, line 32:    delete "reach", insert --each--

Signed and Sealed this

Fifteenth Day of February 1983

[SEAL]

Attest:

GERALD J. MOSSINGHOFF

Attesting Officer    Commissioner of Patents and Trademarks